US 8,347,223 B2

(12) United States Patent
Ikegami

(10) Patent No.: US 8,347,223 B2
(45) Date of Patent: Jan. 1, 2013

(54) GUI EVALUATION SYSTEM, METHOD, AND PROGRAM FOR EVALUATING A TEXT INPUT COMPONENT

(75) Inventor: Teruya Ikegami, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/119,965

(22) PCT Filed: Aug. 7, 2009

(86) PCT No.: PCT/JP2009/003824
§ 371 (c)(1),
(2), (4) Date: Mar. 21, 2011

(87) PCT Pub. No.: WO2010/035387
PCT Pub. Date: Apr. 1, 2010

(65) Prior Publication Data
US 2011/0173551 A1 Jul. 14, 2011

(30) Foreign Application Priority Data
Sep. 29, 2008 (JP) ................................. 2008-251807

(51) Int. Cl.
*G06F 3/048* (2006.01)
(52) U.S. Cl. ........ 715/780; 715/221; 715/224; 715/225; 717/125; 717/127; 714/38.1
(58) Field of Classification Search .................. 715/224, 715/780; 717/127; 714/38.1
See application file for complete search history.

(56) References Cited

U.S. PATENT DOCUMENTS

| | | | | |
|---|---|---|---|---|
| 5,008,810 A | * | 4/1991 | Kessel et al. | 715/234 |
| 5,600,789 A | * | 2/1997 | Parker et al. | 714/38.11 |
| 6,983,451 B2 | * | 1/2006 | Colaiuta | 717/125 |
| 7,237,231 B2 | * | 6/2007 | Lambert | 717/127 |
| 7,945,820 B2 | * | 5/2011 | Kaefer et al. | 714/57 |
| 8,196,112 B1 | * | 6/2012 | Cansizlar | 717/126 |
| 2010/0064178 A1 | * | 3/2010 | Dhulipalla et al. | 714/38 |

FOREIGN PATENT DOCUMENTS

| | | |
|---|---|---|
| JP | 07-084765 | 3/1995 |
| JP | 08-241191 | 9/1996 |
| JP | 2000-112784 | 4/2000 |
| JP | 2004-110267 | 4/2004 |
| JP | 2004-234402 | 8/2004 |
| JP | 2006-244195 | 9/2006 |

OTHER PUBLICATIONS

International Search Report—PCT/JP2009/003824—Oct. 20, 2009.

\* cited by examiner

*Primary Examiner* — Alvin Tan
(74) *Attorney, Agent, or Firm* — Young & Thompson

(57) ABSTRACT

An evaluation data specifying section specifies, as an evaluation data set, a test input data combination selected from plural pieces of test input data and for which no warning message is displayed when these test input data are input into all text input components on the screen to be evaluated and input is completed. An input result acquiring section acquires, as input result information, information capable of specifying whether a warning message is displayed when test input data to be input into one text input component are sequentially changed from a state where each test input data in the specified evaluation data set is input into the corresponding text input component and input is completed, the content of a warning message if the warning message is displayed, and information indicative of test input data input when the warning message is displayed.

15 Claims, 15 Drawing Sheets

WINDOW A

| ITEM A: | |
| ITEM B: | |
| ITEM C: | |
| ITEM D: | |

[ OK ] [ CANCEL ]

(A)

WINDOW A

| ITEM NAME | TEST DATA | INPUT DATA |
|---|---|---|
| ITEM A | - | ¥¥documents¥data¥file.txt |
| ITEM B | all | - |
| ITEM C | D200-D203 | - |
| ITEM D | all | - |

(B)

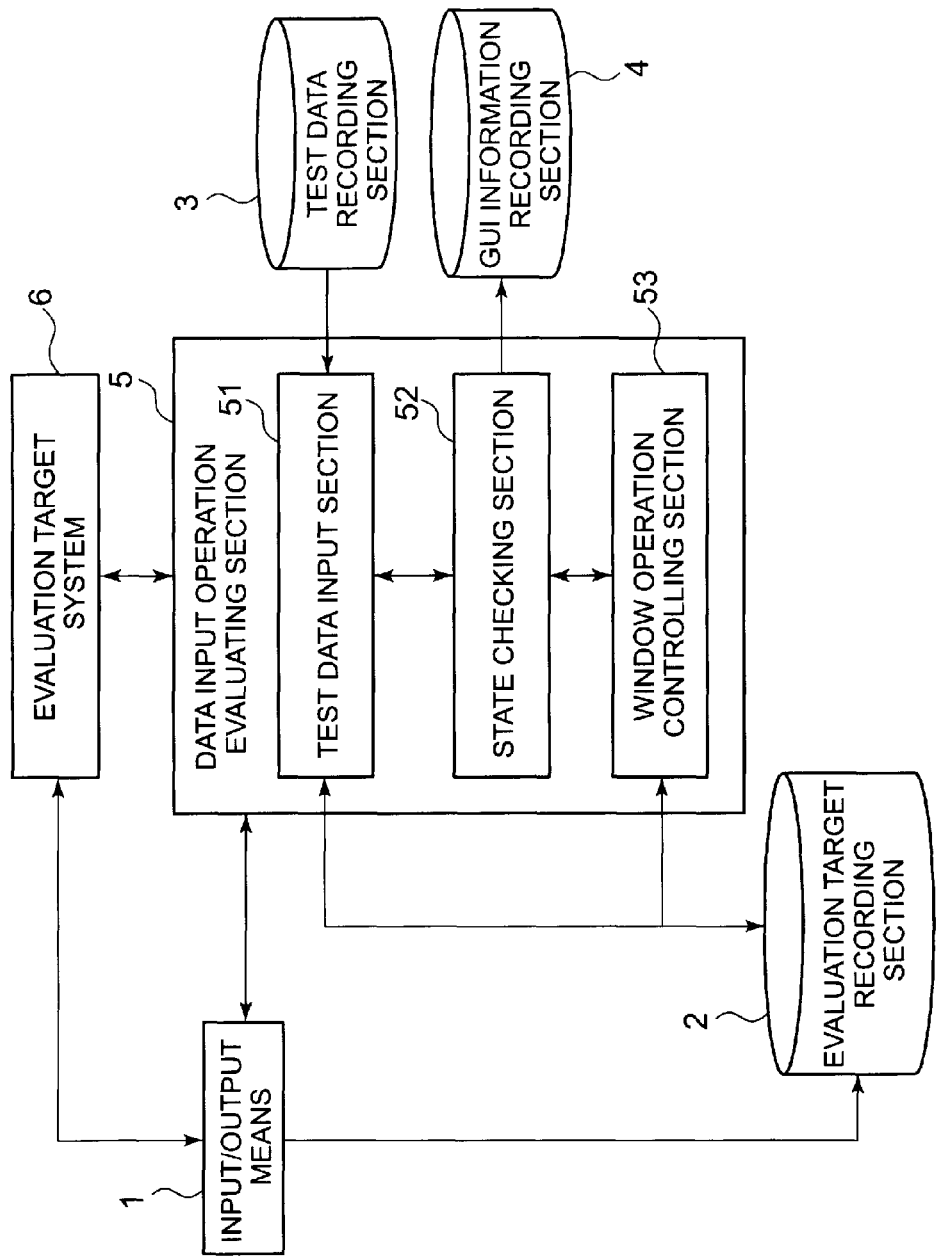

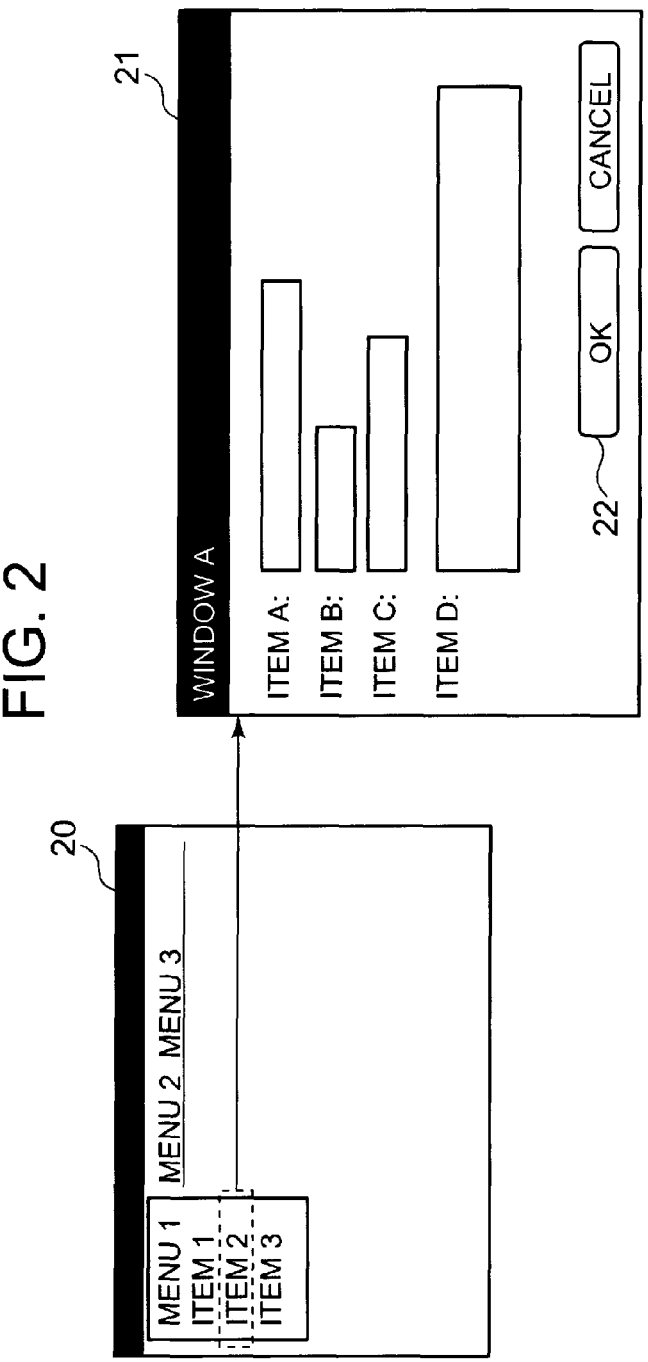

FIG. 4

| DATA NO. | DATA CONTENT | REMARKS |
|---|---|---|
| D001 | | BLANK |
| D002 | abcde | HALF-WIDTH ENGLISH |
| D003 | ABCDE | FULL PITCH ENGLISH |
| D004 | AIUEO | JAPANESE |
| D005 | aiueo | SUB-TYPE JAPANESE |
| D006 | aiueo | HALF-WIDTH SUB-TYPE JAPANESE |
| .. | .. | .. |
| D011 | -1 | NUMERIC(-1) |
| D012 | 0 | NUMERIC(0) |
| D013 | 1 | NUMERIC(1) |
| D014 | 10 | NUMERIC(10) |
| .. | .. | .. |
| D100 | abcdeabcdeabcdeabcde | HALF-WIDTH ENGLISH, 20 CHARACTERS |
| D101 | abcdeabcdeabcdeabcdeabcdeabcdeabcdeabcde | HALF-WIDTH ENGLISH, 40 CHARACTERS |
| .. | .. | .. |
| D200 | 20080401 | YYYYMMDD |
| D201 | 2008/04/01 | YYYY/MM/DD |
| D202 | 080401 | YYMMDD |
| D203 | 08/04/01 | YY/MM/DD |
| .. | .. | .. |

| SCREEN NAME | ITEM NAME | INPUT RESULTS (INPUT DATA, MESSAGE CONTENT) |
|---|---|---|
| WINDOW A | ITEM A<br>ITEM B<br>ITEM C<br>ITEM D | D001: PLEASE FILL IN 'ITEM A'      D002, D003: PLEASE FILL IN 'ITEM A' IN JAPANESE<br>D001: PLEASE FILL IN 'ITEM B'<br><br>D100: PLEASE FILL IN 'ITEM C' WITHIN TEN CHARACTERS |
| WINDOW B | ITEM A<br>ITEM B<br>ITEM E | D001: PLEASE FILL IN 'ITEM E'<br><br>D001: PLEASE FILL IN 'ITEM E'      D002-D010: PLEASE ENTER NUMERIC VALUE<br>D011: PLEASE ENTER NUMERIC VALUE OF ZERO OR ABOVE |

FIG. 12

| SCREEN NAME | ITEM NAME | INPUT RESULTS (INPUT DATA, MESSAGE CONTENT) |
|---|---|---|
| WINDOW A | ITEM A<br>ITEM B<br>ITEM C<br>ITEM D | D001: PLEASE FILL IN 'ITEM A'   D002, D003: PLEASE FILL IN 'ITEM A' IN JAPANESE<br>D001: PLEASE FILL IN 'ITEM B'<br><br>D100: PLEASE FILL IN 'ITEM C' WITHIN TEN CHARACTERS |
| WINDOW B | ITEM A<br>ITEM B<br>ITEM E | D001: PLEASE FILL IN 'ITEM A'<br><br>D001: PLEASE FILL IN 'ITEM E'   D002-D010: PLEASE ENTER NUMERIC VALUE<br>D011: PLEASE ENTER NUMERIC VALUE OF ZERO OR ABOVE |

(A)

| SCREEN NAME | ITEM NAME | DETERMINATION ON INPUT CONSISTENCY | PROBLEM | ASSOCIATED SCREEN NAME |
|---|---|---|---|---|
| WINDOW A | ITEM A | ! WARNING | INPUT CONDITION (HALF-WIDTH ALPHA-NUMERAL D002, D003) INDISPENSABLE/OPTIONAL (BLANK D001) | WINDOW B |
| | ITEM B<br>ITEM C<br>ITEM D | ! WARNING<br>○ NO PROBLEM<br>○ NO PROBLEM | | WINDOW B |
| WINDOW B | ITEM A | ! WARNING | INPUT CONDITION (HALF-WIDTH ALPHA-NUMERAL D002, D003) INDISPENSABLE/OPTIONAL (BLANK D001) | WINDOW A |
| | ITEM B<br>ITEM E | ! WARNING<br>○ NO PROBLEM | | WINDOW A |

| SCREEN NAME | ITEM NAME | MESSAGE EXPRESSION | PROBLEM |
|---|---|---|---|
| WINDOW A | ITEM A<br>ITEM B<br>ITEM C<br>ITEM D | ○NO PROBLEM<br>○NO PROBLEM<br>○NO PROBLEM<br>○NO PROBLEM | |
| WINDOW B | ITEM A<br>ITEM B<br>ITEM E | ○NO PROBLEM<br>○NO PROBLEM<br>×PROBLEM | NO ITEM NAME WRITTEN (D002-D003)<br>NO ITEM NAME WRITTEN (D011) |

GUI EVALUATION SYSTEM, METHOD, AND PROGRAM FOR EVALUATING A TEXT INPUT COMPONENT

TECHNICAL FIELD

The present invention relates to a GUI evaluation system, a GUI evaluation method and a GUI evaluation program for evaluating system usability, particularly to a GUI evaluation system, a GUI evaluation method and a GUI evaluation program for evaluating the validity of a data input method required of a user or error checking.

BACKGROUND ART

A GUI (graphical user interface) is widely used as an interface used when a user inputs and outputs information into and from a computer system (hereinafter called a system). The GUI may be evaluated to evaluate system usability. An example of evaluating the GUI is to check, on a data entry screen provided by an evaluation target system the usability of which is to be evaluated, whether data input is indispensable or optional, check for the presence or absence of restrictions on the input data (such as character type and the number of characters), check whether a warning message is output when there is a deficiency in the input, and evaluate the appropriateness of the content of the warning message. When these checks and evaluation are made manually, an evaluator checks for and records the results obtained by the evaluator entering various data respectively into text input areas. When the evaluation is conducted manually, the evaluation workload increases. In addition, there is a possibility that problems are overlooked.

There are known a GUI automatic evaluation device for automatically evaluating a GUI and a test conducting device (for example, see Patent Documents 1 and 2). The GUI automatic evaluation device described in Patent Document 1 inputs a screen designing guide and accumulates guide data as format rules. The device also accumulates, as information on the GUI, attribute information and attribute values for each window in a system to be evaluated. Then, the device checks the information on the GUI against the rules for each window and outputs the checking results. A means for generating the information on the GUI from the product specifications, a source program, a GUI building tool or the like is also described in Patent Document 1.

In the testing device described in Patent Document 2, an operation database (DB), a user sequence designated by a user when executing a test and a complementary sequence executed complementarily to execute the user sequence according to a procedure are stored. Then, when executing the user sequence according to the user sequence execution procedure, the device checks for the state of the GUI. When the user sequence cannot be executed, the operation DB is searched for an appropriate supplementary sequence so that the user sequence will be executed after the supplementary sequence is executed. The testing device described in Patent Document 2 can execute a test for automatically performing a predetermined operational procedure.

A web screen creating tool, which is capable of checking for the appropriateness of a term or word on a web screen, is described in Patent Document 3. The web screen creating tool checks a source file of the web screen for homonyms, declensional Kana endings and synonyms of terms pre-registered as being likely to be misspelled. Specifically, when a registered term is detected on the web screen to be evaluated, alternatives to the term are displayed as a list.

CITATION LIST

Patent Literature

Patent Document 1 Japanese Patent Application Publication No. 8-241191
Patent Document 2 Japanese Patent Application Publication No. 2004-110267
Patent Document 3 Japanese Patent Application Publication No. 2004-234402

SUMMARY OF INVENTION

Technical Problem

When the GUI automatic evaluation device described in Patent Document 1 is employed, if the specifications or source program of a system to be evaluated cannot be acquired because the system is still in prototype stage or it is another company product, the evaluator will be required to write information on the GUI manually. If the work is done manually, the information on the GUI may not be created correctly. Even if the specifications are available, the specifications may include errors. In other words, correct evaluation may not be made unless an actually operating system to be evaluated is evaluated.

When the testing device described in Patent Document 2 is employed, it can be checked whether a predetermined user sequence can be executed normally, but it takes time to prepare for the sequence in response to the system to be evaluated. In addition, the GUI on which the sequence is executed or the sequence itself cannot be evaluated.

The web screen creating tool described in Patent Document 3 cannot evaluate the usability characteristics of terms other than unregistered ones.

It is desired to evaluate a message to be output from a system to be evaluated when an incorrect input (input that violates a restriction) is given to a text input component to be displayed on a screen, on which a user enters data, and requiring text input, or a text input component on which some restrictions are imposed such as the character type and the number of characters. For example, when an incorrect input is given, it is desired to evaluate whether a message for warning the user about it (hereinafter called a warning message) is displayed or whether the content of the warning message displayed is appropriate. If the evaluation is made manually, the workload of an evaluator will increase. In addition, this makes a check omission more likely. This is because the evaluator himself is required to enter various data into respective input components on each screen in the system to be evaluated in order to get detailed evaluation results. This is also because if two or more text input components are present on a screen to be evaluated, it will be difficult to specify to which data input of a text input component the warning message corresponds. Note that the text input component is, for example, the display of a shape such as a rectangle displayed on the screen to be evaluated, i.e., an area (text box) in which the user is urged to enter a text or the like.

In Patent Documents 1 and 2 mentioned above, the devices for automatically evaluating a GUI are described, but these devices do not allow for evaluation of the appropriateness of a warning message. Therefore, when two or more text input components are present on the screen, the devices do not also allow for specifying for which data input of an input component the warning message is displayed.

Therefore, it is an object of the present invention to provide a GUI evaluation system, a GUI evaluation method and a GUI evaluation program capable of evaluating the appropriateness of a message output from a system to be evaluated.

Solution to Problem

A GUI evaluation system according to the present invention is a GUI evaluation system for evaluating a text input component on a screen to be evaluated and included in the evaluation system, comprising: a test data recording means for storing plural pieces of test data different in character attribute; an evaluation data specifying means for specifying, as an evaluation data set, data on a test input data combination selected from the plural pieces of test input data stored in the test data recording means and corresponding to a text input component into which each data is input, wherein no warning message is displayed for the test input data combination when these pieces of input data are input into all text input components on the screen to be evaluated and input is completed; an input result acquiring means for acquiring, as input result information, information capable of specifying whether a warning message is displayed when test input data to be input into one text input component are sequentially changed from a state where each test input data in the evaluation data set specified by the evaluation data specifying means is input into the corresponding text input component and input is completed, the content of a warning message if the warning message is displayed, and information indicative of test input data input when the warning message is displayed; and an input result information outputting means for outputting the input result information acquired by the input result acquiring means in association with the text input component.

A GUI evaluation method according to the present invention is a GUI evaluation method for evaluating a text input component on a screen to be evaluated and included in the evaluation system, comprising the steps of: storing, in a test data recording means, plural pieces of test data different in character attribute; specifying, as an evaluation data set, data on a test input data combination selected from the plural pieces of test input data stored in the test data recording means and corresponding to a text input component into which each data is input, wherein no warning message is displayed for the test input data combination when these pieces of input data are input into all text input components on the screen to be evaluated and input is completed; acquiring, as input result information, information capable of specifying whether a warning message is displayed when test input data to be input into one text input component are sequentially changed from a state where each test input data in the evaluation data set specified is input into the corresponding text input component and input is completed, the content of a warning message if the warning message is displayed, and information indicative of test input data input when the warning message is displayed; and outputting the acquired input result information in association with the text input component.

A GUI evaluation program according to the present invention is a GUI evaluation program making a computer in a GUI evaluation system, which evaluates a text input component on a screen to be evaluated and included in the evaluation system, perform: test data storing processing for storing, in a test data storing means, plural pieces of test data different in character attribute; evaluation data set specifying processing for specifying, as an evaluation data set, data on a test input data combination selected from the plural pieces of test input data stored in the test data storing means and corresponding to a text input component into which each data is input, wherein no warning message is displayed for the test input data combination when these pieces of input data are input into all text input components on the screen to be evaluated and input is completed; input result information acquiring processing for acquiring, as input result information, information capable of specifying whether a warning message is displayed when test input data to be input into one text input component are sequentially changed from a state where each test input data in the evaluation data set specified in the evaluation data set specifying processing is input into the corresponding text input component and input is completed, the content of a warning message if the warning message is displayed, and information indicative of test input data input when the warning message is displayed; and input result information outputting processing for outputting the input result information acquired in the input result information acquiring processing in association with the text input component.

Advantageous Effects of the Invention

According to the present invention, an evaluator can process an easy and thorough evaluation of the validity and consistency of a data input method required of a user and error checking.

BRIEF DESCRIPTION OF DRAWINGS

FIG. 1 It depicts a block diagram showing a configuration of a GUI evaluation system according to a first exemplary embodiment of the present invention together with a system to be evaluated.

FIG. 2 It depicts an explanatory drawing showing an example of an evaluation target screen in the system to be evaluated.

FIG. 3 It depicts an explanatory drawing showing an example of evaluation target screen information recorded in an evaluation target recording section.

FIG. 4 It depicts an explanatory drawing showing an example of test data stored in a data recording section.

FIG. 10 It depicts an explanatory drawing showing GUI information recorded in a GUI information recording section.

FIGS. 12A and 12B It depicts an explanatory drawing for describing processing performed by an input operation determining section FIG. 13 It depicts an explanatory drawing for describing processing performed by the input operation determining section.

DESCRIPTION OF EMBODIMENTS

Figure 5:
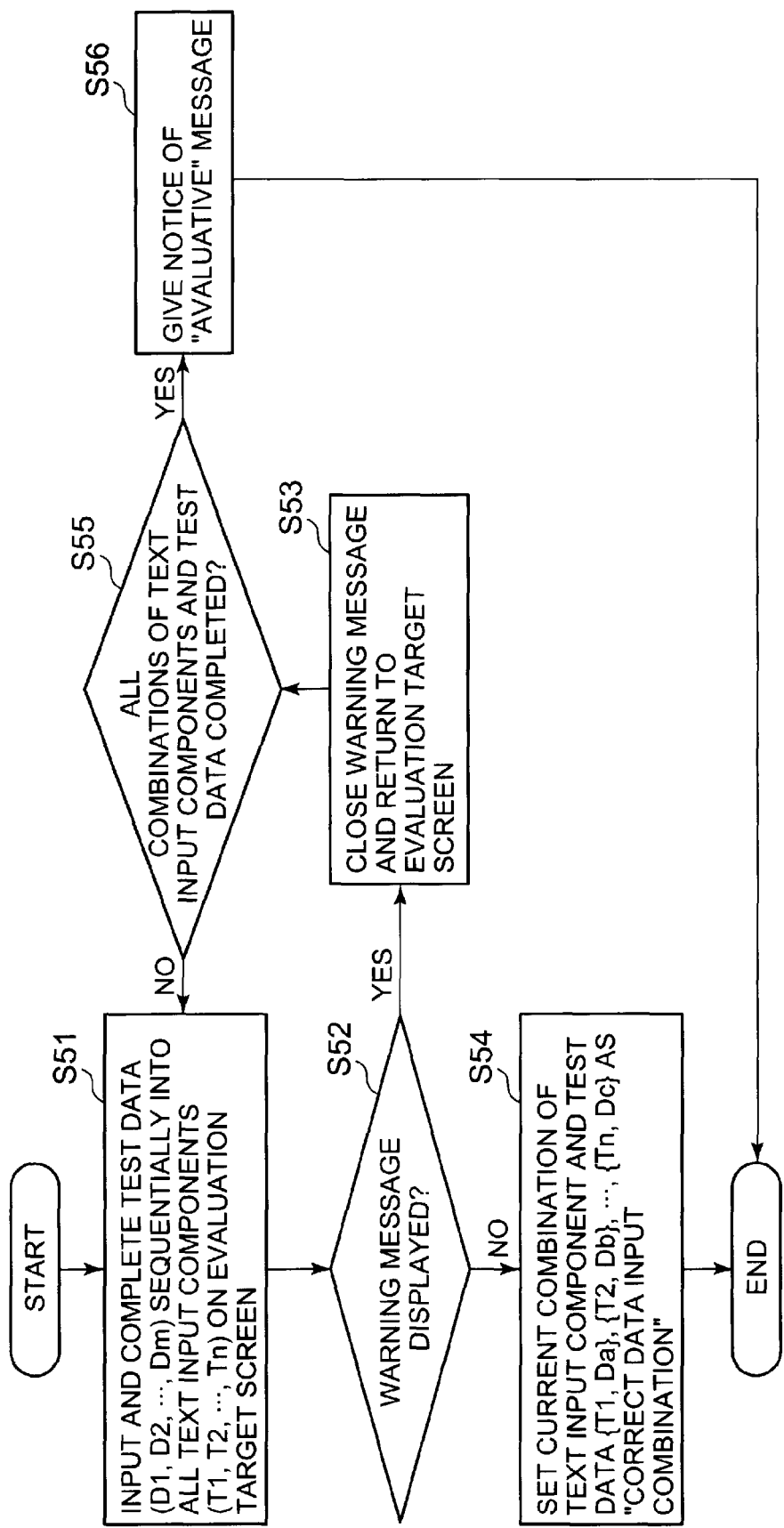
FIG. 5 It depicts a flowchart showing search processing for a correct data input combination.

Specific embodiments of the present invention will now be described with reference to the accompanying drawings.

First Exemplary Embodiment

FIG. 1 is a block diagram showing a configuration of a GUI evaluation system according to a first exemplary embodiment of the present invention together with a system to be evaluated. The GUI evaluation system shown in FIG. 1 includes an input/output means 1, an evaluation target recording section 2, a test data recording section 3, a GUI information recording section 4 and a data input operation evaluating section 5. The data input operation evaluating section 5 includes a test data input section 51, a state checking section 52 and a window operation controlling section 53.

The input/output means 1 includes an input means, such as a mouse and a keyboard, for entering information indicative of the content of operations performed by an evaluator, and an output means such as a display. The evaluation target recording section 2 stores the name of an evaluation target screen, a way to call up (path) and data indicative of an input completing component on the evaluation target screen as information on the evaluation target screen in an evaluation target system 6 and registered by an operator operating the input/output means 1 while referring to the screen in the evaluation target system 6. The "input completing component" is a button or the like displayed on the evaluation target screen to complete a text input in a text input component (e.g., the indication of "OK").

The test data recording section 3 stores, as test data, a text data group including various test data different in character attribute such as the character type and the number of characters.

The data input operation evaluating section 5 refers to evaluation target data stored in the evaluation target recording section 2 to input test data stored in the test data recording section 3 onto the evaluation target screen in the evaluation target system 6. Then, it records, in the GUI information recording section 4, the result of completing the input data through the input completing component as input result information.

In the data input operation evaluating section 5, the test data input section 51 inputs test data stored in the test data recording section 3 into a text input component on the evaluation target screen, and notifies the state checking section 52 of a state in which it is desired to complete the input. The test data input section 51 also specifies, as a correct data input combination, a combination of a text input component and test data for which no warning message is displayed when the input is completed. Further, the test data input section 51 changes input data of the text input component as the evaluation target sequentially from the state where the correct data input combination is input on the evaluation target screen.

The state checking section 52 checks whether the evaluation target screen is open in the evaluation target system 6, what kind of test data is entered in each text input component on the evaluation target screen, and whether a warning message is displayed. Upon receipt of a notification from the test data input section 51, the state checking section 52 records, in the GUI information recording section 4, test data input in each text input component on the evaluation target screen. Then, it outputs, to the window operation controlling section 53, a notification that the input is to be completed.

Further, the state checking section 52 acquires the content of a warning message in such a state that the warning message is displayed, and records, in the GUI information recording section 4, a text input component corresponding to the warning message, input test data and the content of the warning message as input result information. Then, it closes the warning message, outputs, to the window operation controlling section 53, an instruction indicating that the evaluation target screen is called up again, and outputs, to the test data input section 51, an instruction indicating that test data is changed and input. If the evaluation target screen is not open, the state checking section 52 outputs, to the window operation controlling section 53, an instruction indicating that the evaluation target screen is called up.

The window operation controlling section 53 refers to the information on the evaluation target screen stored in the evaluation target recording section 2 to perform an input completing operation for completing input on the evaluation target screen according to the input of the state checking section 52, an operation to close the warning message, and an operation to call up the evaluation target screen again.

For example, the data input operation evaluating section 5 is implemented by a CPU operating according to a program on a computer that realizes the GUI evaluation system.

FIG. 2 is an explanatory drawing showing an example of the evaluation target screen in evaluation target system 6. In the example shown in FIG. 2, when the evaluation target system 6 is booted, the evaluation target system 6 displays a window 20 of a main screen including menus as shown in FIG. 2(A) on a display in the evaluation target system 6. Then, when a menu in the window 20 is selected, the evaluation target system 6 displays a screen (window A) shown in FIG. 2(B) on the display. When the window operation controlling section 53 in the data input operation evaluating section 5 selects a menu for evaluation, the window A shown in FIG. 2(B) becomes a screen 21 to be evaluated. The evaluation target screen 21 includes four text input components, and when an "OK" button 22 as the input completing component is pressed, the input is completed. In the example shown in FIG. 2, the evaluation target system 6 displays the window A shown in FIG. 2(B) in response to the selection of item 2 on menu 1 included in the window 20.

FIG. 3 is an explanatory drawing showing an example of evaluation target screen information stored in the evaluation target recording section 2. In the example shown in FIG. 3, the evaluation target screen information includes the name of the evaluation target screen, a way to call up (path) and information indicative of an input completing component. The evaluation target screen information concerning the window A illustrated in FIG. 2 is recorded as shown in a row 30 in FIG. 3. In other words, "window A" is recorded as the name of the evaluation target screen, "main screen>menu 1>item 2" is recorded as the path, and "OK" is recorded as information indicative of the input completing component.

FIG. 4 is an explanatory drawing showing an example of test data stored in the data recording section 3. In the example shown in FIG. 4, test data consists of data No., data content and remarks. The data No. is a serial number uniquely assigned to each test data, and the data content is a body of the test data. In the remarks, the character attributes of the test data are described. The data recording section 3 stores blank test data and test data having various data contents different in character attribute such as the character type (alpha-numeral, Japanese), full-pitch/half-width, the number of characters and the format (date, time, zip code, or the like).

Referring next to flowcharts of FIG. 5 and FIG. 6, the operation of the data input operation evaluating section 5 will be described. In the following description, a text input component having a fixed text box as an evaluation target section to urge a user to enter a text is taken as an example, but the text input component may also be any section other than the section having a fixed text box as long as the section has an area in which the user can enter data, such as a section (combo box) which not only presents options to the user but also allows the user to enter any data other than the presented options.

FIG. 5 is a flowchart showing search processing for a correct data input combination performed by the test data input section 51, the state checking section 52 and the window operation controlling section 53. The following may refer, as "test," to checking whether test data (D1, D2, ..., Dm) input into a text input component (T1, T2, ..., Tn) is completed and a warning message is displayed.

The test data input section 51 inputs test data (D1, D2, ..., Dm) sequentially into text input components (T1, T2, ..., Tn) on the screen to be evaluated and input is completed (step S51).

Initially, in processing step S51, the test data input section 51 inputs blank (D1) sequentially into all the text input components (T1, T2, ..., Tn). In the example shown in FIG. 4, the blank (D1) corresponds to test data having data number D001. After inputting the blank (D1) into all the text input components (T1, T2, ..., Tn), the test data input section 51 notifies the state checking section 52 of a state in which it is desired to complete input in order to complete the input. Upon receipt of the notification from the test data input section 51, the state checking section 52 outputs an instruction to the window operation controlling section 53 to complete the input. The window operation controlling section 53 completes the input in accordance with the instruction. From the evaluation target screen information stored in the evaluation target recording section 2, the window operation controlling section 53 can recognize what the input completing component is in concrete terms ("OK" button in this example).

The state checking section 52 checks whether a warning message is displayed upon completing of the input (step S52). When the state checking section 52 checks that a warning message is displayed, the window operation controlling section 53 closes the warning message to restore the state in which the evaluation target screen is displayed (step S53). In other words, the window operation controlling section 53 refers to the evaluation target screen information stored in the evaluation target recording section 2 to perform an operation for calling up the evaluation target screen again. Then, the procedure proceeds to step S55. If the state checking section 52 checks that no warning message is displayed, a combination of the text input component and the test data {T1, D1}, {T2, D1}, ..., {Tn, D1} is determined to be a correct data input combination (step S54). However, since D1 is blank test data, it is generally considered that it does not become the correct data input combination at this stage.

In step S55, the test data input section 51 checks whether the test is completed on all the combinations of the text input components (T1, T2, ..., Tn) and the test data (D1, D2, ..., Dm). If the test is completed on all the combinations, the data input operation evaluating section 5 outputs a message indicative of being "avaluative" to the input/output means 1 and ends the processing (step S56). On the other hand, if there is any combination on which the test is not completed, the test shifts to the next combination, i.e., the procedure returns to step S51. However, since test data blank (D1) is only used at the stage where the test is completed on the first combination, there are combinations on which the test is not completed yet.

Next, in processing step S51, the test data input section 51 inputs test data D2 into text input component T1 and blank (D1) into the other text input components (T2, ..., Tn) to complete the input. The state checking section 52 checks whether a warning message is displayed upon completing of the input (step S52).

Like at the initial stage (where blank (D1) is input into all the text input components (T1, ..., Tn)), if the state checking section 52 checks that a warning message is displayed, the window operation controlling section 53 closes the warning message to restore the state where the evaluation target screen is displayed (step S53). Then, the procedure proceeds to step S55. If the state checking section 52 checks that no warning message is displayed, a combination of the text input component and the test data {T1, D1}, {T2, D2}, ..., {Tn, D2} is determined to be the correct data input combination (step S54).

The data input operation evaluating section 5 continues the test while changing the combinations of the text input components (T1, T2, ..., Tn) and the test data (D1, D2, ..., Dm) to be input into the text input components (T1, T2, ..., Tn) until the warning message is no longer displayed or until completion of the test on all combinations of the text input components (T1, T2, ..., Tn) and the test data (D1, D2, ..., Dm) before the warning message becomes no longer being displayed.

Then, a combination of the text input component and the test data {T1, Da}, {T2, Db}, ..., {Tn, Dc} (where a, b, c is any of 1 to m) when the warning message is no longer displayed is determined to be the correct data input combination (step S54).

If a warning message is displayed during the test on all the combinations of the text input components (T1, T2, ..., Tn) and the test data (D1, D2, ..., Dm), the message indicative of being "avaluative" is output to the input/output means 1 (step S56).

Next, a method of evaluating a text input component on an evaluation target screen using a correct data input combination found in the processing shown in FIG. 5 will be described. FIG. 6 is a flowchart showing processing for evaluating a text input component performed by the test data input section 51, the state checking section 52 and the window operation controlling section 53.

The test data input section 51 first decides on an evaluation target (step S601). Initially, an unevaluated text input component located at the top of the screen to be evaluated is selected as the evaluation target. If two or more unevaluated text input components exist in the same level, priority is given to the leftmost text input component. Thus, the text input component located at the upper left of the screen first becomes the evaluation target. Next, the test data input section 51 inputs a correct data input combination into the text input component on the evaluation target screen (step S602). After that, the content of the text input component to be evaluated is rewritten with test data (step S603). Specifically, the text input component as the evaluation target on the screen to be evaluated is made blank and the correct data is input into the other text input components.

Next, the input is completed. In other words, the test data input section 51 notifies the state checking section 52 of a state in which it is desired to complete the input. Upon receipt of the notification from the test data input section 51, the state checking section 52 outputs an instruction to the window operation controlling section 53 to complete the input. The window operation controlling section 53 completes the input in accordance with the instruction. The state checking section 52 checks whether the warning message is displayed upon completing of the input. Then, the state checking section 52 records, in the GUI information recording section, the text input component to be evaluated, test data, and the presence or absence and content of a resulting warning message collectively as input result information (also called GUI information) (step S604). Specifically, as an example, the state checking section 52 records, in the GUI information recording section, the section name (item name) of the text input component to be evaluated and the serial number of the test data. As for the warning message, for example, if no warning message is displayed, nothing is recorded, while if a warning message is displayed, the content (text) of the warning message is recorded in the GUI information recording section.

On the other hand, if a warning message is displayed (step S605), the window operation controlling section 53 closes the warning message and restores the display to the evaluation target screen (step S606). In other words, the display returns to the evaluation target screen on which no warning message is displayed. If the input is completed without displaying a warning message and the evaluation target screen is closed or transits to the next screen, the window operation controlling section 53 refers to the evaluation target screen information stored in the evaluation target recording section 2 to call up the evaluation target screen again (step S607).

Next, when there remain test data not being input into the text input component to be evaluated, the test data input section 51 selects test data from thereamong to be newly input into the text input component in processing step S603 (step S608 and S609), and the procedure returns to step S602. When test data not being input into the text input component does not remain, i.e., when all test data have been input into the text input component, the procedure proceeds to step S610.

Thus, test data are input into the text input component while changing the test data to repeat processing for recording GUI information (steps S602 to S609), and upon completion of the evaluation of the text input component as the current evaluation target using all test data, processing in step S610 is performed.

In step S610, the test data input section 51 checks whether there is any unevaluated text input component on the evaluation target screen. If there is any unevaluated text input component, a text input component as the next evaluation target is selected and the procedure returns to step S601. If there is no unevaluated text input component, i.e., upon completion of the evaluation in processing steps S602 to S609 on all the text input components on the evaluation target screen, the evaluation processing for the evaluation target screen is ended.

Next, an example of operation of the search processing for a correct data input combination and the evaluation processing for a text input component in the exemplary embodiment will be described by taking a specific screen as an example.

Figure 7:
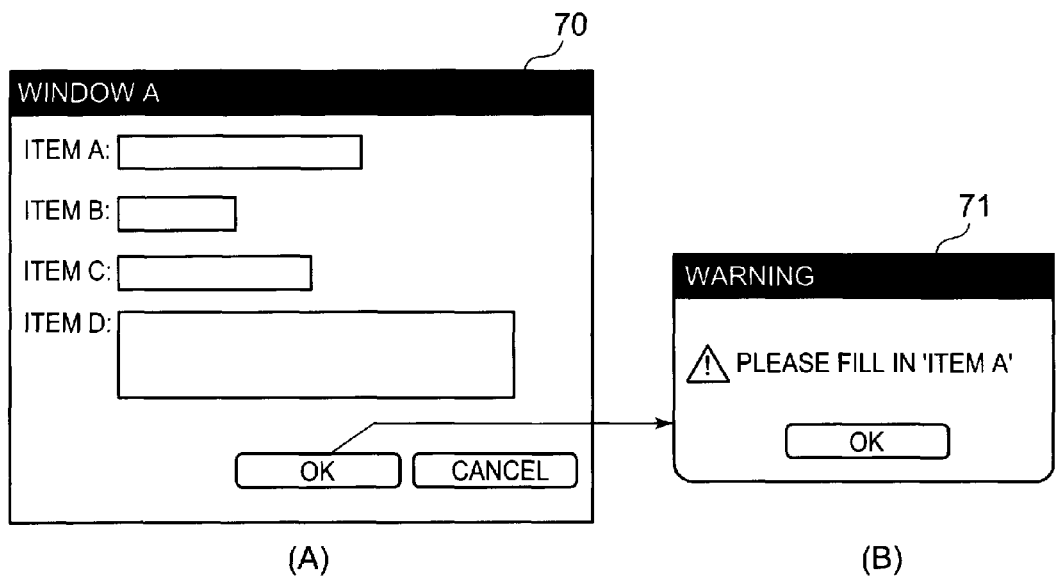
FIGS. 7A and 7B It depicts an explanatory drawing showing an example of an evaluation target screen and a warning message.

FIG. 7 is an explanatory drawing showing an example of an evaluation target screen and a warning message. In the example shown in FIG. 7, an evaluation target screen 70 includes four text input components, and input is completed through the "OK" button as the input completing component (see FIG. 7(B)). Shown in FIG. 7(B) is a state in which a warning message 71 is displayed when input is completed on condition that all the text input components remain blank.

At first, the data input operation evaluating section 5 in the GUI evaluation system repeatedly performs processing for inputting and completing test data combinations into the four text input components on the evaluation target screen 70 while changing the test data combinations to search for test data for which no warning message is displayed.

Figure 8:
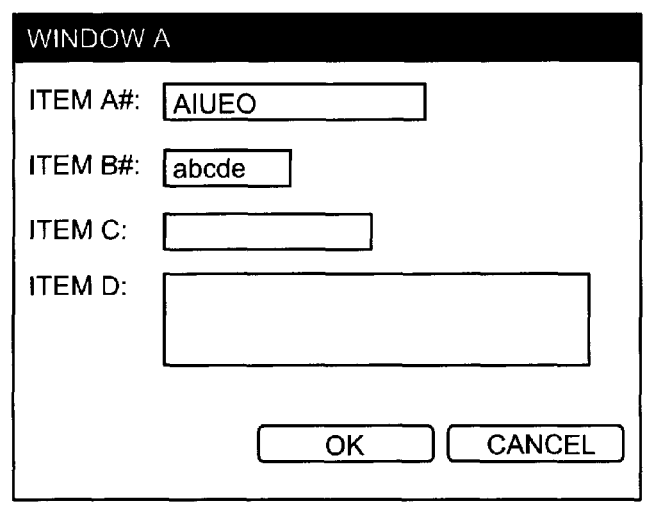
FIG. 8 It depicts an explanatory drawing showing a state of inputting a correct data input combination for which no warning message is displayed when the input is completed.

FIG. 8 is an explanatory drawing showing a state of inputting a correct data input combination for which no warning message is displayed when the input is completed. In the example shown in FIG. 8, test data D004 (A I U E O: Japanese vowels) is input into item A, test data D002 (abcde: half-width English) is input into item B, and test data D001 (blank) is input into item C and item D. In FIG. 8, "#" denotes that test data other than blank is input, but it is not actually displayed on the screen. The following description will be made by taking, as an example, a case where test data to be input into a text input component as an evaluation target is changed from the state shown in FIG. 8 and the input is completed to obtain input result information as the evaluation result.

Figure 9:
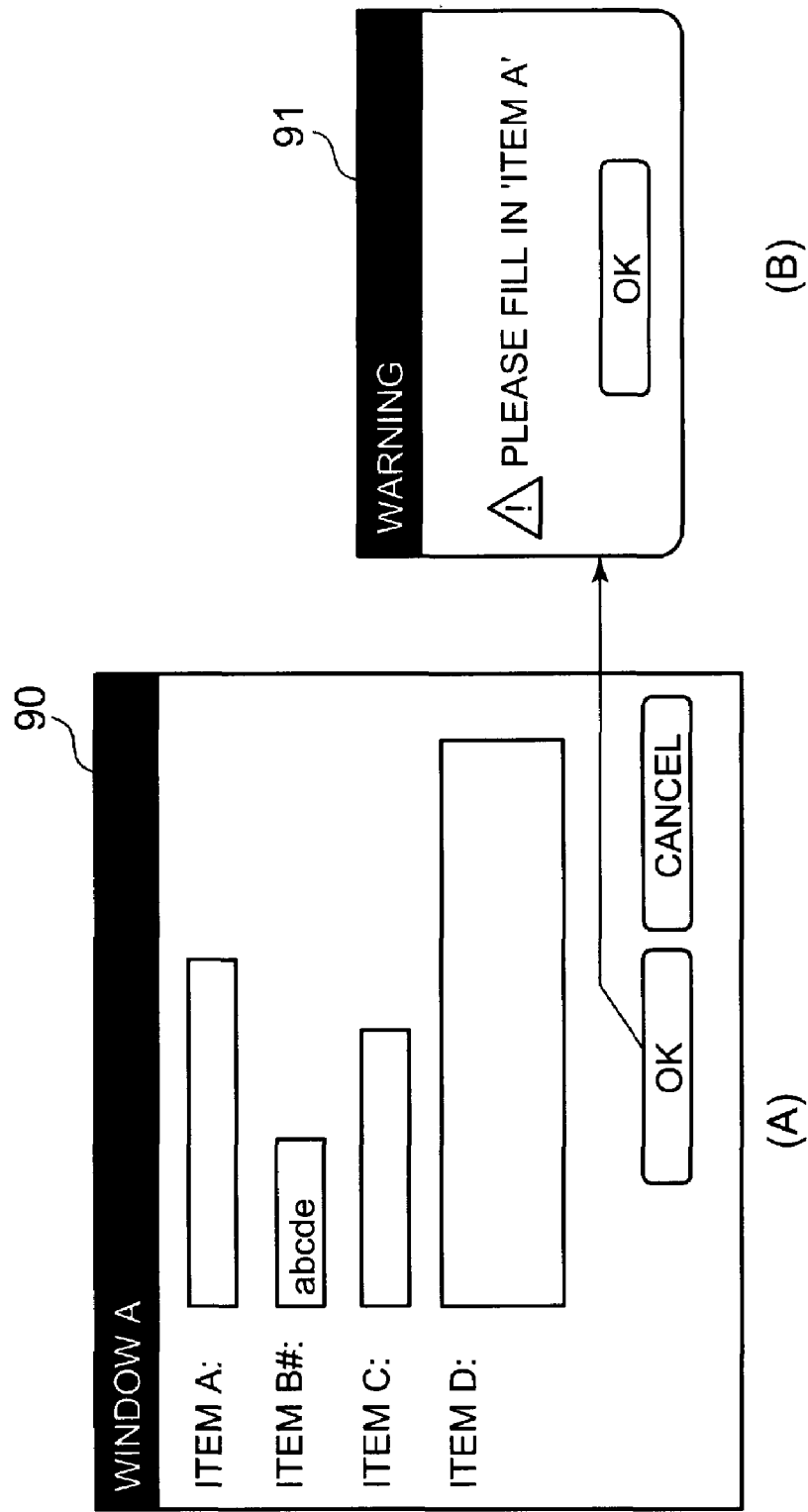
FIGS. 9A and 9B It depicts an explanatory drawing showing an example of an evaluation target screen and a warning message when item A is targeted for evaluation.

FIG. 9 is an explanatory drawing showing an example of an evaluation target screen and a warning message when item A is targeted for evaluation. Shown in FIG. 9 is a case where the evaluation target system 6 displays a warning message 91 as a result of inputting test data D001 (blank) into item A as a text input component and completing the test data after a correct data input combination is input into respective text input components on an evaluation target screen 90. In FIG. 9, "#" denotes the text input component to be evaluated, but it is not actually displayed on the screen.

Figure 6:
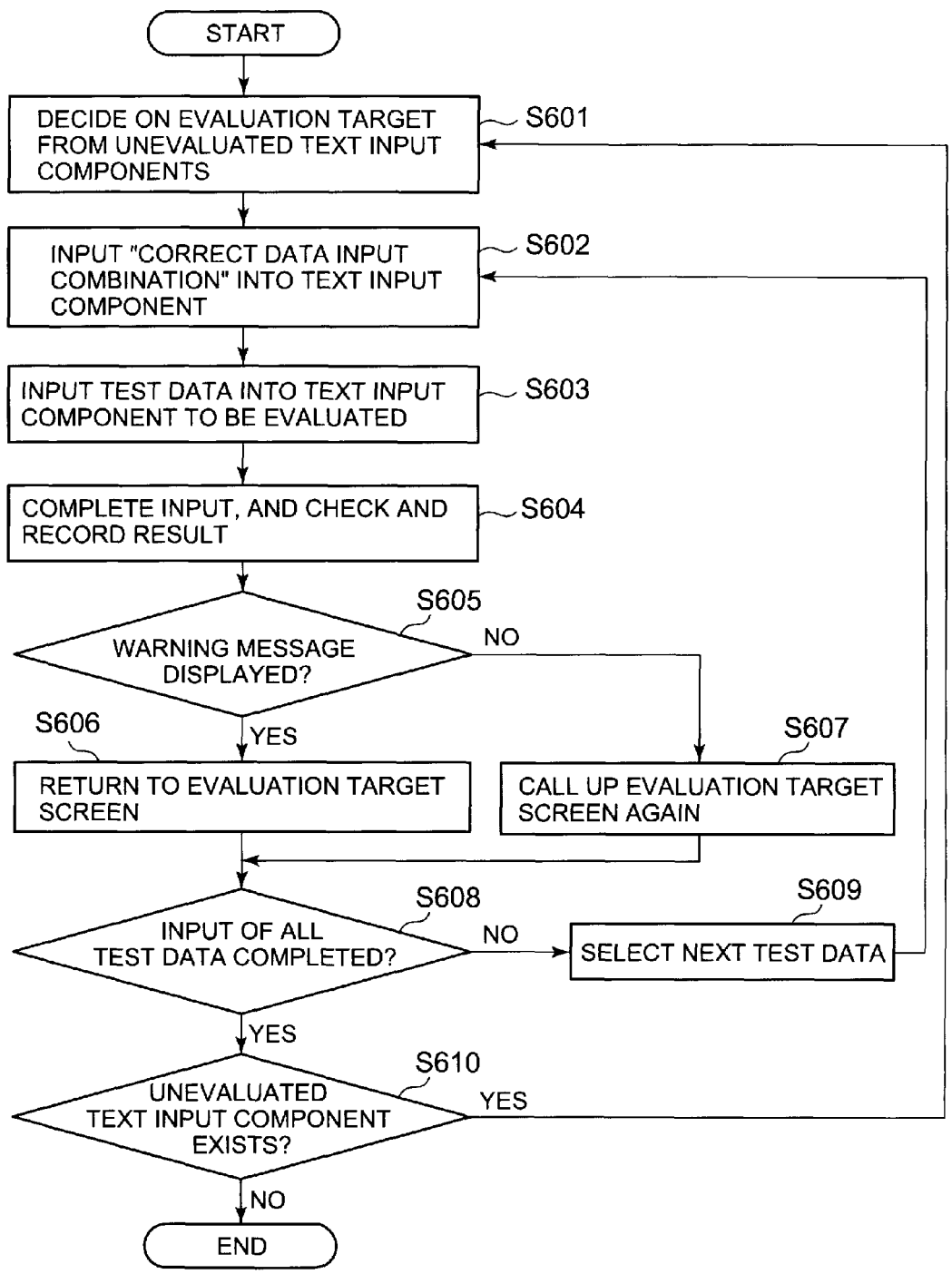
FIG. 6 It depicts a flowchart showing evaluation processing for a text input component.

The test data input section 51 performs the evaluation processing shown in FIG. 6. In other words, text input components of items A, B, C and D on the evaluation target screen shown in FIG. 9(A) are sequentially evaluated. The display state shown in FIG. 9(A) corresponds to the display state when processing in steps S601, S602 and S603 is performed on item A as the first evaluation target.

After completion of the evaluation processing for the text input components of items A, B, C and D as evaluation targets, GUI information is recorded in the GUI information recording section 4. FIG. 10 is an explanatory drawing showing GUI information recorded in the GUI information recording section 4. In the example shown in FIG. 10, input data (test data) when item names (text input components) are listed for each evaluation target screen and a warning message is displayed for each item name and the evaluation results (message contents) are recorded as the GUI information. Shown in FIG. 10 is an example where window B (see FIGS. 2(A) and FIG. 3) is also evaluated. In the example shown in FIGS. 2(A) and FIG. 3, the window operation controlling section 53 refers to a path included in evaluation target data stored in the evaluation target recording section 2 and changes screens in the evaluation target system 6 as main screen>menu 1>item 3, thus enabling the start of evaluation on window B.

Suppose that window A is set as an evaluation target screen from the GUI information illustrated in FIG. 10. In this case, the following is found: A warning message that reads "Please fill in 'item A'" is displayed when blank test data (D001) (see FIG. 4) is input into item A, a warning message that reads "Please fill in 'item A' in Japanese" is displayed when English test data (D002, D003) (see FIG. 4) is input, and no warning message is displayed when any other test data is input. A warning message that reads "Please fill in 'item B'" is displayed when blank test data (D001) is input into item B, and no warning message is displayed when any other test data is input. No warning message is displayed even when any test data is input into item C. A warning message that reads "Please fill in 'item C' within ten characters" is displayed when test data (D100) (see FIG. 4) of 20 characters is input into item D, and no warning message is displayed when any other test data is input.

Suppose next that window B including text input components of items A, B and E is set as the evaluation target screen. In this case, the following is found: A warning message that reads "Please fill in 'item A'" is displayed when blank test data (D001) is input into item A, and no warning message is displayed when any other test data is input. No warning message is displayed even when any test data is input into item B. A warning message that reads "Please fill in 'item E'" is displayed when blank test data (D001) is input into item E, a warning message that reads "Please enter a numeric value" is displayed when test data (D002-D010) as characters is input, a warning message that reads "Please enter a numeric value of zero or above" is displayed when test data (D011) as a negative value is input, and no warning message is displayed when any other test data is input.

As described above, the GUI evaluation system of the exemplary embodiment first specifies, for an evaluation target screen, a test data combination as correct data for which no warning message is displayed. Next, correct data is input into each text input component, and from this state, input is completed while changing test data to be input for each text input component. Then, the display of a warning message when the input is completed is checked, and a combination of the text input component, the input test data and the warning message is recorded as GUI information. If no warning message is displayed, any warning message will not be recorded.

In other words, the GUI evaluation system of the exemplary embodiment first specifies a combination of a text input component and test data for which no warning message is displayed when the input is completed on the evaluation target screen, and after inputting the specified combination, changes input data only for the text input component to be evaluated (recorded) to check the presence or absence and content of a warning message. This allows an evaluator just to specify a way to call up a screen to be evaluated (path) and an input completing component on the evaluation target screen in order to obtain the presence or absence and contents of warning messages when various data are input into all text input components on the evaluation target screen. In other words, the evaluator can conduct an easy and thorough evaluation of the validity and consistency of a data input method and error checking required of a user.

Second Exemplary Embodiment

Figure 11:
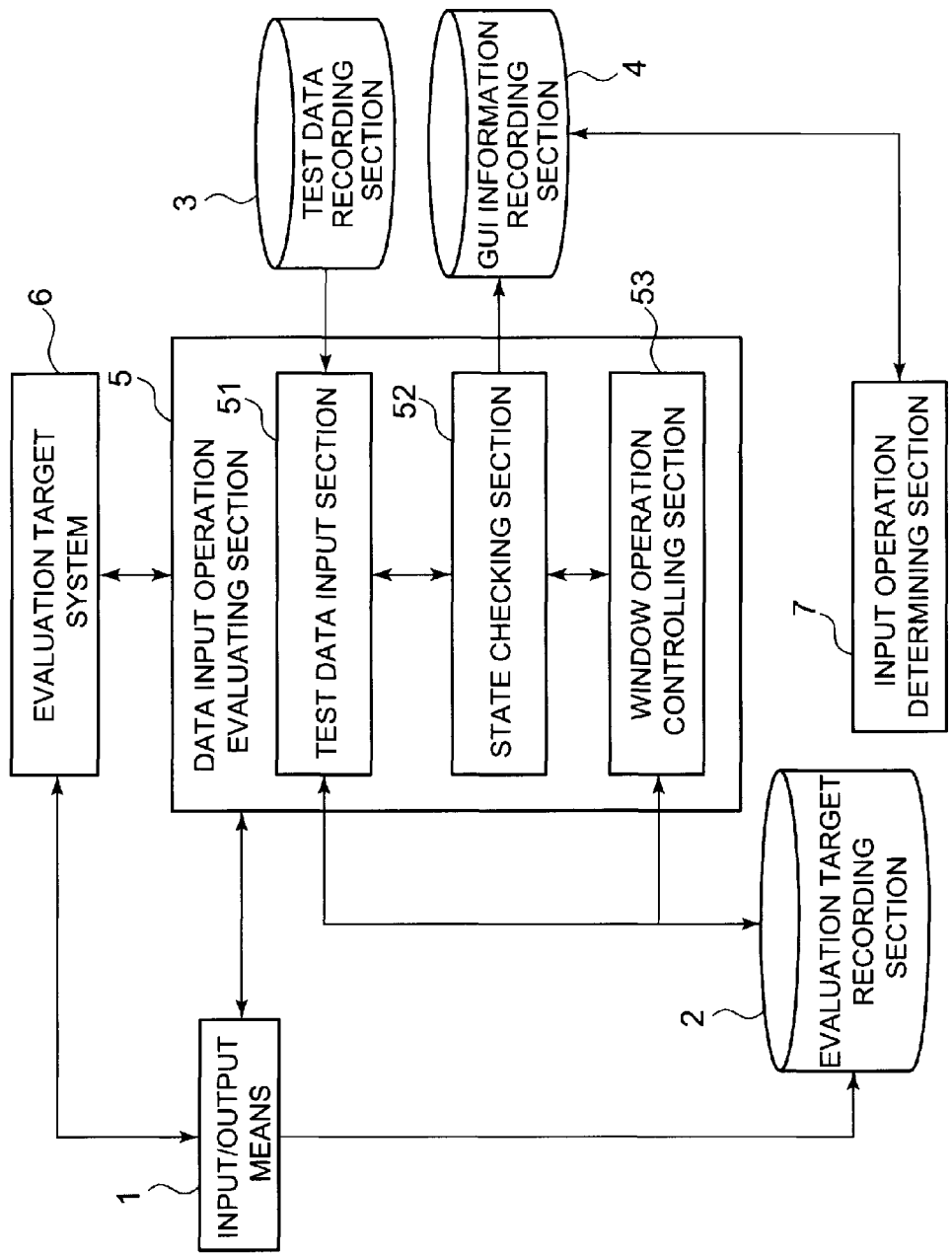
FIG. 11 It depicts a block diagram showing a configuration of a GUI evaluation system according to a second exemplary embodiment of the present invention together with a system to be evaluated.

FIG. 11 is a block diagram showing a configuration of a GUI evaluation system according to a second exemplary embodiment of the present invention together with a system to be evaluated. The GUI evaluation system shown in FIG. 11 is such that an input operation determining section 7 is further provided in the GUI evaluation system of the first exemplary embodiment shown in FIG. 1.

The input operation determining section 7 targets GUI information recorded in the GUI information recording section 4 in the first exemplary embodiment not only to determine the consistency of outputs (warning messages in this example) in response to input data in an associated one of plural windows in the evaluation target system 6, but also to evaluate the appropriateness of message expressions.

For example, the input operation determining section 7 can be implemented by a CPU operating according to a program on a computer that realizes the GUI evaluation system.

FIG. 12 and FIG. 13 are explanatory drawings for describing processing performed by the input operation determining section 7. FIG. 12(A) shows GUI information recorded in the GUI information recording section 4. The content of description in FIG. 12(A) is the same as the content of description in FIG. 10. FIG. 12(B) shows input consistency determination results as processing results of the input operation determining section 7. FIG. 13 shows determination results of the appropriateness of message contents. In the present exemplary embodiment, the consistency of character attributes of input data is illustrated as input consistency. The appropriateness of a message content is determined based on whether a corresponding item name is written in the content of the warning message, and if no item name is written, it is determined that the content is inappropriate.

In the present exemplary embodiment, it is assumed that there is a predetermined association between window A and window B to be displayed depending on the selection of a menu in the evaluation target system 6. As an example, suppose that window A and window B are an application form for a business trip and the form of a report about a business trip on the same business, respectively. Although the same item names (item A and item B) exist in both window A and window B, it is assumed that the same item name bears the same meaning. As an example, the item name is "destination" and item B is "employee's name or employee's code."

The input operation determining section 7 acquires input results corresponding to items having the same item names in two or more associated windows (window A and window B in this example) from the GUI information stored in the GUI information recording section 4 as illustrated in FIG. 10. For example, information (data) indicating "D001: Please fill in 'item A'" as an input result corresponding to item A in window A and "D002, D003: Please fill in 'item A' in Japanese" are input. Further, information indicating "D001: Please fill in 'item A'" as an input result corresponding to item A in window B is input.

Then, the input operation determining section 7 compares the input result corresponding to item A in window A with the input result corresponding to item A in window B. As a result of comparison, it is checked that input of English half-width characters into item A in window A is not permitted whereas input of English half-width characters into item A in window B is permitted. Therefore, the input operation determining section 7 sets the determination result of the consistency of input into item A between windows A and B as "warning." Even when the input results are different, it does not necessarily means that there is a problem. For this reason, the determination result is set as "warning" rather than as "problem." The input operation determining section 7 also adds, to the determination result, information indicative of a factor upon which it determines the lack of consistency ("English half-width character" as the input condition in the example shown in FIG. 12(B)), and the screen name of the associated window.

It is also checked that when the input result corresponding to item B in window A and the input result corresponding to item B in window B are compared, data input in window A is indispensable but data input in window B is optional. Therefore, the input operation determining section 7 sets the determination result of the consistency of input into item B between windows A and B as "warning." The input operation determining section 7 also adds, to the determination result, information indicative of a factor upon which it determines the lack of consistency (indispensable/optional in the example shown in FIG. 12(B) (it means inconsistency because the data input are indispensable and optional)), and the screen name of the associated window.

Further, the input operation determining section 7 performs processing for checking for each message content included in the input result corresponding to each item in each of the plural windows (window A and window B in this example). When the message content corresponding to each item is checked, all message contents related to items other than item E in window B include the expression of "item z is" (where z is any one of A to E) (as an example of a method of specifying a text input component) but the message content related to item E in window B lacks the expression of "item z is." Therefore, the input operation determining section 7 sets the determination result as "problem" with the message expression of item E in window B. The input operation determining section 7 also adds, to the determination result, information indicative of a factor upon which it determines that there is a problem ("no item name written" and the serial number of the test data in the example shown in FIG. 13).

For example, the input operation determining section 7 records the determination result in the GUI information recording section 4, but it may store the determination result in storage means other than the GUI information recording section 4.

As described above, the GUI evaluation system of the present exemplary embodiment determines, from the GUI information, the consistency of inputs into the text input components. The GUI evaluation system also determines the appropriateness of message contents output from the evaluation target system 6. Then, the GUI evaluation system outputs the determination results.

The evaluator can obtain the determination results of input consistency and appropriateness of the message contents without performing particular operations. Then, based on the determination results obtained, the evaluator can easily understand the possibility of a problem with input consistency on the GUI in the evaluation target system 6 or the lack of common grounds among the message contents.

Third Exemplary Embodiment

Figure 14:
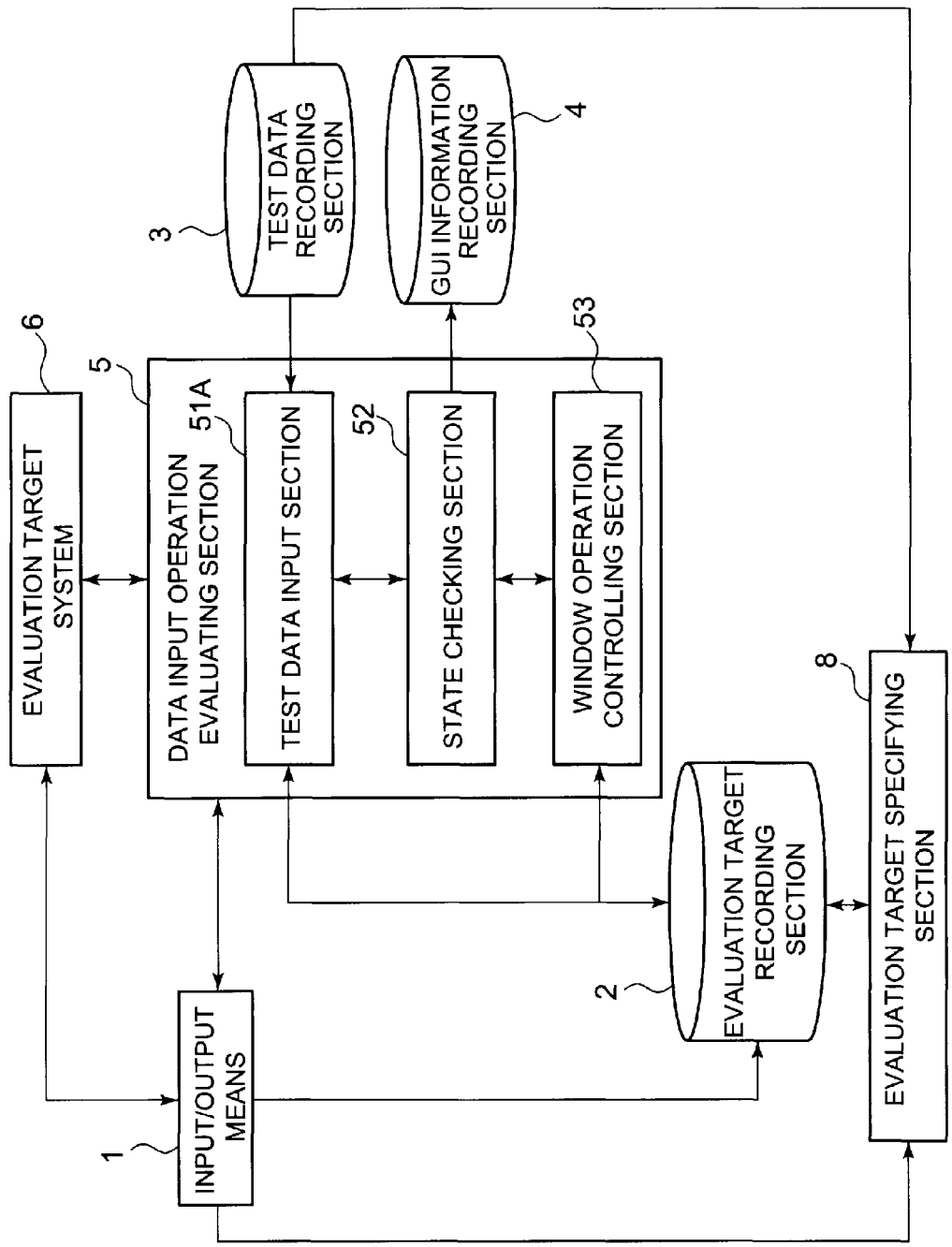
FIG. 14 It depicts a block diagram showing a configuration of a GUI evaluation system according to a third exemplary embodiment of the present invention together with a system to be evaluated.

FIG. 14 is a block diagram showing a configuration of a GUI evaluation system according to a third exemplary embodiment of the present invention together with a system to be evaluated. The GUI evaluation system shown in FIG. 14 is such that an evaluation target specifying section 8 is further provided in the GUI evaluation system of the first exemplary embodiment shown in FIG. 1. Further, in the data input operation determining section 5, a test data input section 51A is such that the function of referring to test information created by the evaluation target specifying section 8 is added to the function of the test data input section 51 in the first exemplary embodiment.

For example, the evaluation target specifying section 8 is implemented by a CPU operating according to a program on a computer that realizes the GUI evaluation system.

If a text capable of being input into a text input component included in a window as an evaluation target screen is predetermined to be a specific character string or the like, use of test data stored in the test data recording section 3 may not be able to produce a good evaluation result. Further, if there is a text input component that enables or disables data input in a particular situation, use of test data stored in the test data recording section 3 without any restriction may not be able to produce a good evaluation result as well.

In addition, if a window as the evaluation target screen is provided with a section other than the text input components, use of test data stored in the test data recording section 3 may not be able to obtain an appropriate evaluation result.

The section other than the text input components may be a section having a selection part to allow a user to select one from multiple selection items (radio button), a section having multiple selection items and areas into which a check mark is entered to indicate that the selection items are selected (check box), a section to present, in the form of a list, options from which the user can select one (list box), or the like.

According to the operations performed by the evaluator through the input/output means 1, the evaluation target specifying section 8 creates a file including test character strings for each item on an evaluation target screen, creates data indicative of being targeted for the test or not, and creates data indicative of test data used for evaluation among plural pieces of test data held in the test data recording section 3. The evaluation target specifying section 8 records the created file and data in the evaluation target recording section 2 as test information.

Figure 15:
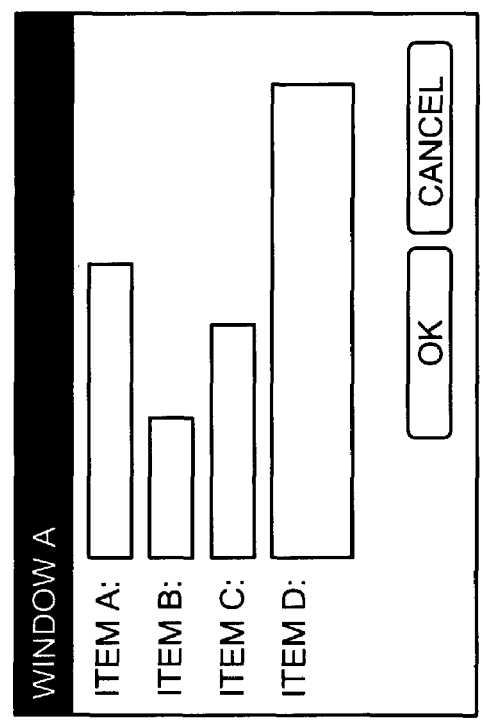
FIGS. 15A and 15B It depicts an explanatory drawing for describing test information created by an evaluation target specifying section.

FIG. 15 is an explanatory drawing for describing test information crated by the evaluation target specifying section 8. FIG. 15(A) shows window A as an example of the evaluation target screen. FIG. 15(B) shows test information created by the evaluation target specifying section 8. In the example shown in FIG. 15(B), the test information includes information indicating that test character strings in the file created by the evaluation target specifying section 8 for item A in window A is used, that all test data stored for item B in the test data recording section 3 are used, that only test data D200 to D203 stored for item C in the test data recording section 3 are used, and that all test data stored for item D in the test data recording section 3 are used.

When test data is input into a text input component, the test data input section 51A in the data input operation determining section 5 refers to test information stored in the evaluation target recording section 2. When the test information illustrated in FIG. 15(B) is stored in the evaluation target recording section 2, the test data input section 51A sequentially inputs test character strings in a file stored in the evaluation target recording section 2, rather than inputting test data stored in the test data recording section 3 for item A in window A, sequentially inputs all test data stored for items B and D in the test data recording section 3, and sequentially inputs only test data D200 to D203 stored for item C in the test data recording section 3.

Processing for checking the display of a warning message and recording a combination of a text input component, input test data input and a warning message as GUI information as processing after the test data input section 51A inputs the test data or test character strings into the text input component and completes the input is the same as the processing performed by the data input operation determining section 5 in the first exemplary embodiment.

Though not illustrated in FIG. 15(B), if the evaluation target specifying section 8 records, in the evaluation target recording section 2, data indicative of being not targeted for testing, the data input operation determining section 5 will exclude an item corresponding to the data from the evaluation targets.

In the third exemplary embodiment, the evaluation target specifying section 8 crates and records the following in the evaluation target recording section 2 as test information:

(a) A file including test character strings;
(b) Data indicative of being targeted or not; and
(c) Data indicative of test data used for evaluation among plural pieces of test data held in the test data recording section 3. However, one or two of (a) to (c) may be created and recorded in the evaluation target recording section 2 as test information. The evaluation target specifying section 8 may also create test information indicative of any condition other than (a) to (c).

As described above, the GUI evaluation system of the present exemplary embodiment creates test information for each item and refers to the test information to evaluate the evaluation target screen. This disables a test that cannot be expected to produce appropriate evaluation results from being conducted. As a result, the evaluation time can be shortened.

Figure 16:
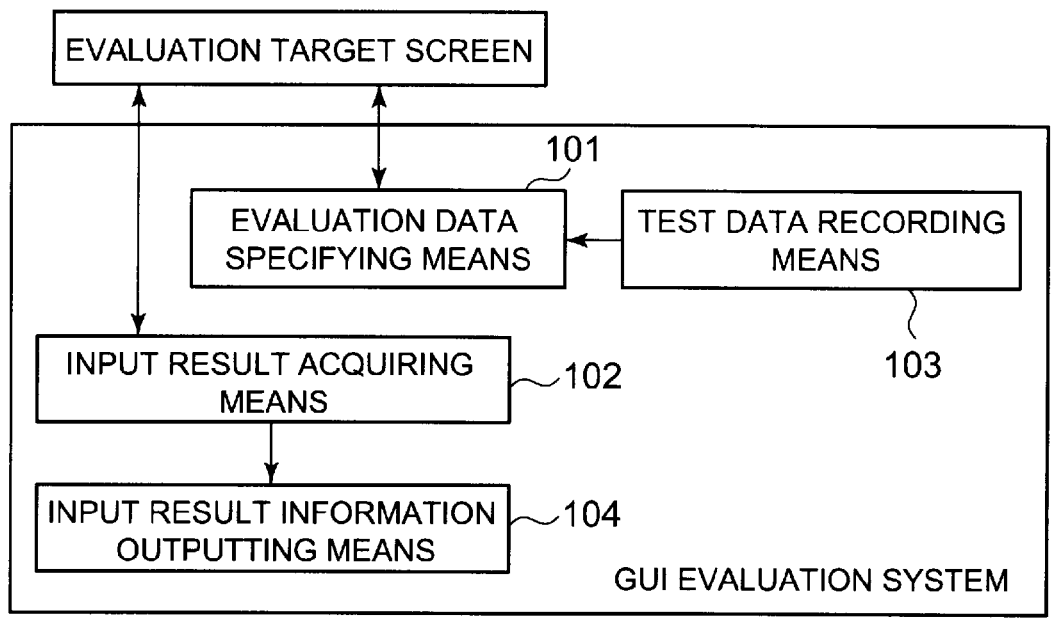
FIG. 16 It depicts a block diagram showing main sections of the GUI evaluation system according to the present invention.

FIG. 16 is a block diagram showing main sections of the GUI evaluation system according to the present invention. As shown in FIG. 16, the GUI evaluation system includes: a test data recording means 103 (corresponding to the test data recording section 4 shown in FIG. 1) for storing plural pieces of test data including those different in character attribute; an evaluation data specifying means 101 (implemented by the data input operation operating section 5 in the system shown in FIG. 1) for specifying, as an evaluation data set, data on a test input data combination (corresponding to correct data) selected from plural pieces of input data stored in the test data recording means 103 and corresponding to a text input component into which each data is input, wherein no warning message is displayed for the test input data combination when these pieces of input data are input into all text input components on an evaluation target screen and the input is completed; an input result acquiring means 102 (implemented by the data input operation operating section 5 in the system shown in FIG. 1) for acquiring, as input result information, information capable of specifying whether a warning message is displayed when test input data to be input into one text input component are sequentially changed from a state where each test input data in the evaluation data set specified by the evaluation data specifying means 101 is input into the corresponding text input component and the input is completed, the content of a warning message if the warning message is displayed, and information indicative of test input data input when the warning message is displayed; and an input result information outputting means 104 (implemented by the state checking section 52 in the system shown in FIG. 1) for outputting the input result information acquired by the input result acquiring means 102 in association with the text input component.

Figure 17:
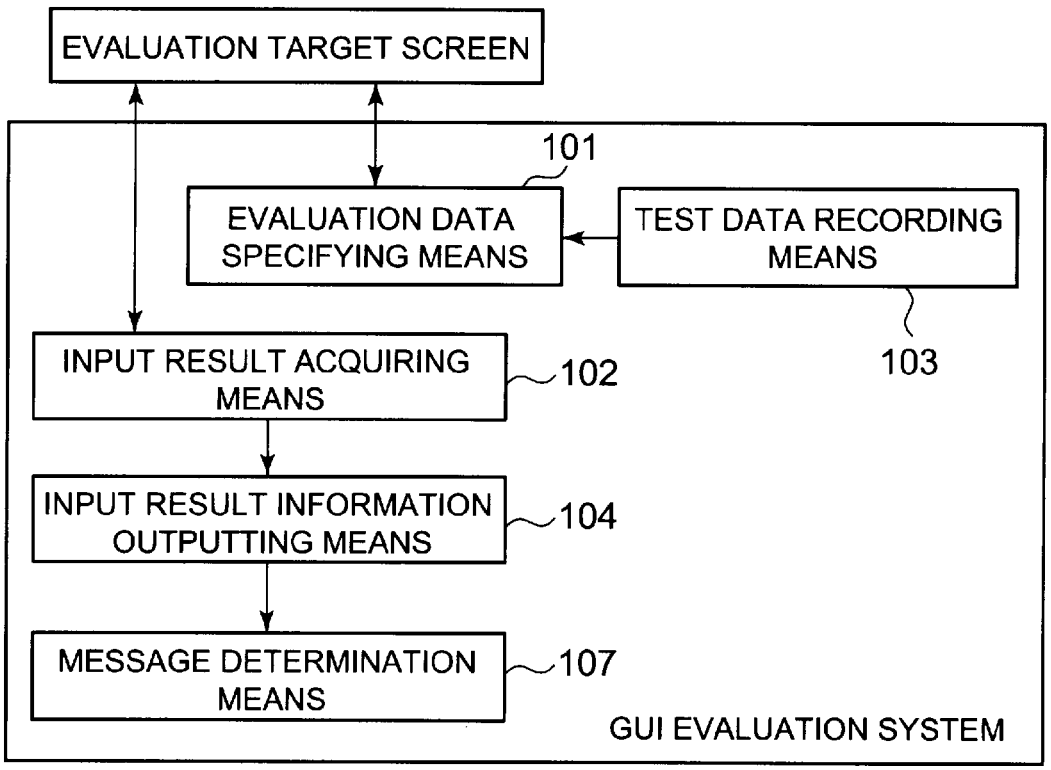
FIG. 17 It depicts a block diagram showing main sections of another exemplary embodiment of the GUI evaluation system according to the present invention.

FIG. 17 is a block diagram showing main sections of another exemplary embodiment of the GUI evaluation system according to the present invention. The GUI evaluation system shown in FIG. 17 is such that message determination means 107 (implemented by the input operation determining section 7 in the system shown in FIG. 11) is added to the GUI evaluation system shown in FIG. 16 to determine whether a method of specifying a text input component (e.g., expression "item z is" (where z is any of A to E)) is included in the content of the warning message included in the input result information output from the input result information outputting means 104 in order to determine the appropriateness of the expression of the warning message.

Figure 18:
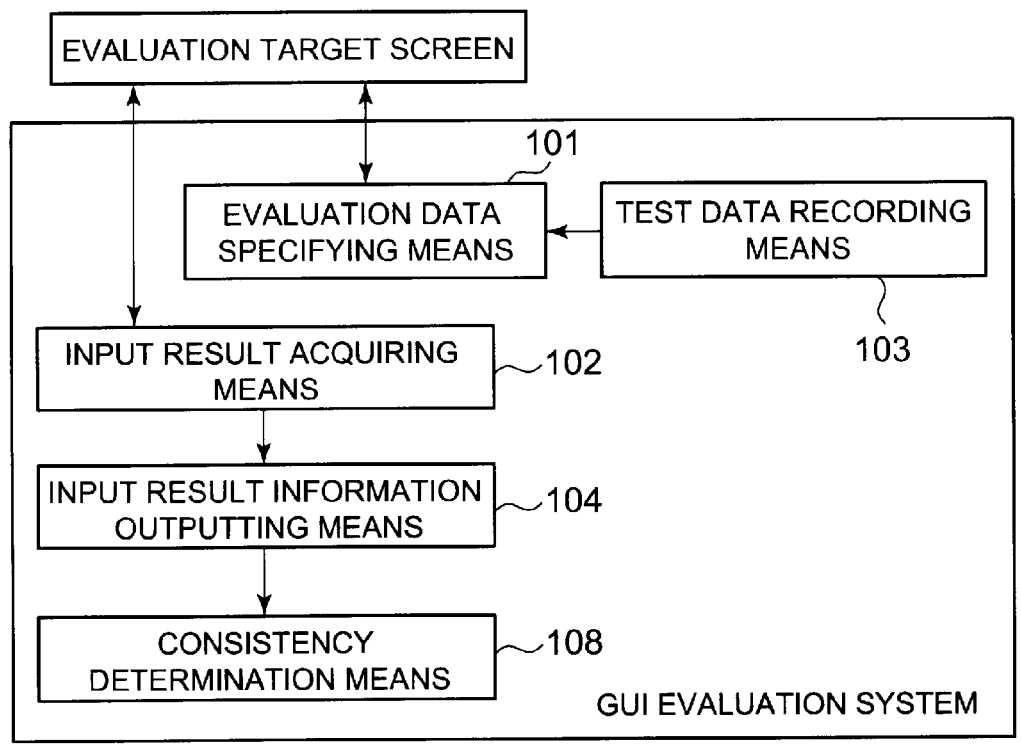
FIG. 18 It depicts a block diagram showing main sections of still another exemplary embodiment of the GUI evaluation system according to the present invention.

FIG. 18 is a block diagram showing main sections of still another exemplary embodiment of the GUI evaluation system according to the present invention. The GUI evaluation system shown in FIG. 18 is such that a consistency determination means 108 (implemented by the input operation determining section 7 in the system shown in FIG. 11) is added to the GUI evaluation system shown in FIG. 16 to determine whether there are text input components having the same item name on two or more screens to be evaluated but different in data input condition (e.g., text attribute restrictions) in order to determine the consistency of data input restrictions on the text input components.

Figure 19:
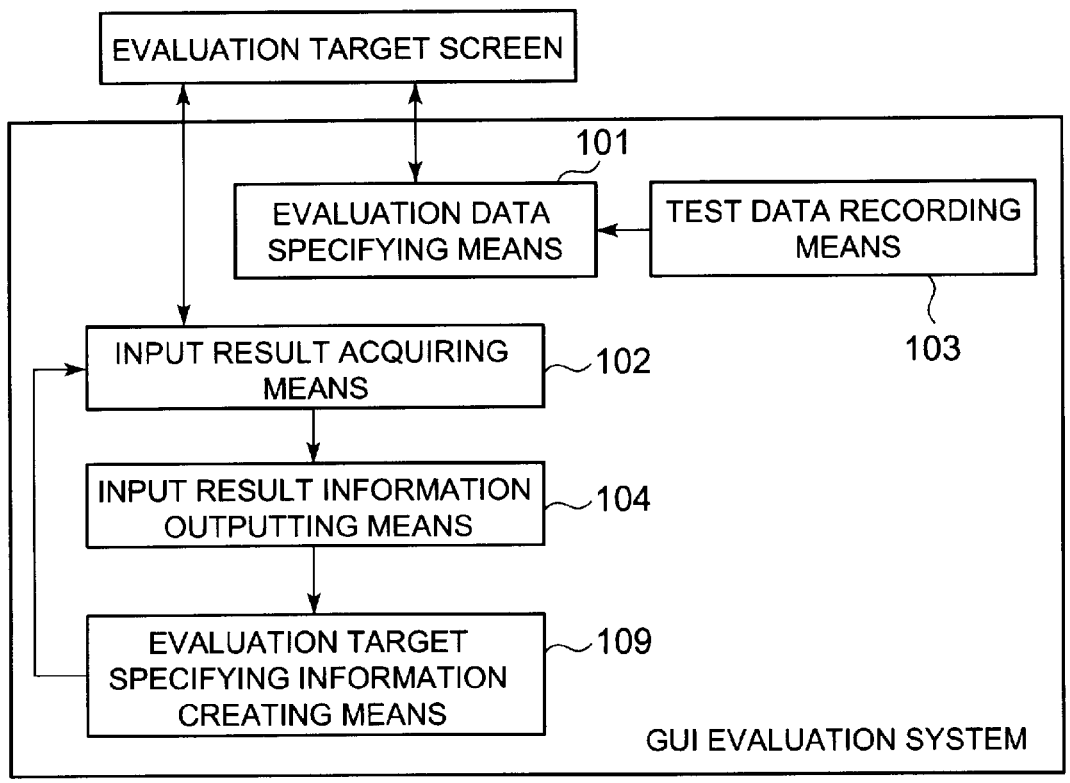
FIG. 19 It depicts a block diagram showing yet another exemplary embodiment of the GUI evaluation system according to the present invention.

FIG. 19 is a block diagram showing yet another exemplary embodiment of the GUI evaluation system according to the present invention. The GUI evaluation system shown in FIG. 19 is such that an evaluation target specifying information creating means 109 (implemented by the evaluation target specifying section 8 in the system shown in FIG. 11) is added to the GUI evaluation system shown in FIG. 16 to create one or more of information indicative of whether test data should be input into an input component on an evaluation target screen, information indicative of test data to be input into the text input component among plural pieces of test data stored in the test data recording means 103 and test input data information for the input component. In the GUI evaluation system shown in FIG. 19, the input result acquiring means 102 performs processing for acquiring input result information according to the information created by the evaluation target specifying information creating means 109.

While the invention is described with reference to the embodiments and examples, the invention is not intended to be limited to the embodiments and examples. Various changes that will be appreciated by those skilled in the art can be made to the configurations and details of the invention within the scope of the invention.

This application claims priority based upon Japanese Patent Application No. 2008-251807 filed Sep. 29, 2008, which is incorporated by reference herein in its entirety.

INDUSTRIAL APPLICABILITY

The present invention is preferably applicable to applications for evaluating system usability.

REFERENCE SIGNS LIST

1 input/output means
2 evaluation target recording section
3 test data recording section
4 GUI information recording section
5 data input operation evaluating section
6 evaluation target system
7 input operation determining section
8 evaluation target specifying section
20 window
21 evaluation target screen
30 row
51, 51A test data input section
52 state checking section
53 window operation controlling section
70 evaluation target screen
71 warning message
90 evaluation target screen
91 warning message
101 evaluation data specifying means 102 input result acquiring means
103 test data recording means
104 input result information outputting means
107 message determination means
108 consistency determination means
109 evaluation target specifying information creating means

The invention claimed is:

1. A GUI evaluation system for evaluating a text input component on a screen to be evaluated and included in the evaluation system, comprising:
a processor;
a test data recording section for storing plural pieces of test input data different in character attribute;
an evaluation data specifying section for specifying, as an evaluation data set, data on a test input data combination selected from the plural pieces of test input data stored in the test data recording section and corresponding to a text input component into which each data is input, wherein no warning message is displayed for the test input data combination when these pieces of input data are input into all text input components on the screen to be evaluated and input is completed;
a consistency determination section for determining whether there are text input components having an identical item name on a plurality of screens to be evaluated but different in data input condition to determine consistency of data input restrictions on the text input components having an identical name;
an input result acquiring section for acquiring, as input result information, information configured to specify whether a warning message is displayed when test input data to be input into one text input component are sequentially changed from a state where each test input data in the evaluation data set specified by the evaluation data specifying section is input into the corresponding text input component and input is completed, the content of the warning message if the warning message is displayed, and information indicative of test input data input when the warning message is displayed; and
an input result information outputting section for outputting the input result information acquired by the input result acquiring section in association with the text input component on the screen to be evaluated.

2. The GUI evaluation system according to claim 1, further comprising an input result information recording section for storing the input result information output from the input result information outputting section.

3. The GUI evaluation system according to claim 1, further comprising
an evaluation target storing section for storing information specifying a way to call up the screen to be evaluated and an input completing component on the screen to be evaluated,
wherein the evaluation data specifying section and the input result acquiring section refer to the information stored in the evaluation target storing section to specify the screen to be evaluated, and refer to the information stored in the evaluation target storing section to complete an input on the screen to be evaluated.

4. The GUI evaluation system according to claim 1, wherein the input result acquiring section sequentially selects test data stored in the test data recording section and inputs the selected test data into the text input component on the screen to be evaluated to change test input data.

5. The GUI evaluation system according to claim 1, further comprising an evaluation target specifying information creating section for creating one or more of information indicative of whether test data should be input into the text input component on the screen to be evaluated, information indicative of test data to be input into the text input component on the screen to be evaluated among plural pieces of test input data stored in the test data recording section, and test input data information on the text input component on the screen to be evaluated,
wherein the input result acquiring section performs processing for acquiring input result information according to the information created by the evaluation target specifying information creating section.

6. A GUI evaluation method for evaluating a text input component on a screen to be evaluated and included in an evaluation system, comprising:
storing, in a test data recording section, plural pieces of test input data different in character attribute;
specifying, as an evaluation data set, data on a test input data combination selected from the plural pieces of test input data stored in the test data recording section and corresponding to a text input component into which each data is input, wherein no warning message is displayed for the test input data combination when these pieces of input data are input into all text input components on the screen to be evaluated and input is completed;
determining whether there are text input components having an identical item name on a plurality of screens to be evaluated but different in data input condition to determine consistency of data input restrictions on the text input components having an identical name;
acquiring, as input result information, information configured to specify whether a warning message is displayed when test input data to be input into one text input component are sequentially changed from a state where each test input data in the evaluation data set specified is input into the corresponding text input component and input is completed, the content of the warning message if the warning message is displayed, and information indicative of test input data input when the warning message is displayed; and
outputting the acquired input result information in association with the text input component on the screen to be evaluated.

7. The GUI evaluation method according to claim 6, further comprising storing, in an input result information recording section, the input result information output.

8. The GUI evaluation method according to claim 6, further comprising
storing, in an evaluation target storing section, information specifying a way to call up the screen to be evaluated and an input completing component on the screen to be evaluated,
wherein when data corresponding to the text input component into which each test input data is input is specified as an evaluation data set and when input result information is acquired, the information stored in the evaluation target storing section is referred to specify the screen to be evaluated and the information stored in the evaluation target storing section is referred to complete an input on the screen to be evaluated.

9. The GUI evaluation method according to claim 6, wherein upon acquiring input result information, test data stored in the test data recording section is sequentially selected and the selected test data is input into the text input component on the screen to be evaluated to change test input data.

10. The GUI evaluation method according to claim 6, further comprising
performing evaluation target specifying information creating processing for creating one or more of information indicative of whether test data should be input into the text input component on the screen to be evaluated, information indicative of test data to be input into the text input component on the screen to be evaluated among plural pieces of test input data stored in the test data recording section, and test input data information on the text input component on the screen to be evaluated,
wherein upon acquiring input result information, processing for acquiring input result information is performed according to the information created in the evaluation target specifying information creating processing.

11. A non-transitory computer-readable data storage medium having stored therein a GUI evaluation program making a computer in a GUI evaluation system, which evaluates a text input component on a screen to be evaluated and included in the evaluation system, perform:
test data storing processing for storing, in a test data recording section, plural pieces of test input data different in character attribute;
evaluation data set specifying processing for specifying, as an evaluation data set, data on a test input data combination selected from the plural pieces of test input data stored in the test data recording section and corresponding to a text input component into which each data is input, wherein no warning message is displayed for the test input data combination when these pieces of input data are input into all text input components on the screen to be evaluated and input is completed;
consistency determination processing for determining whether there are text input components having an identical item name on a plurality of screens to be evaluated but different in data input condition to determine consistency of data input restrictions on the text input components having an identical name;
input result information acquiring processing for acquiring, as input result information, information configured to specify whether a warning message is displayed when test input data to be input into one text input component are sequentially changed from a state where each test input data in the evaluation data set specified in the evaluation data set specifying processing is input into the corresponding text input component and input is completed, the content of the warning message if the warning message is displayed, and information indicative of test input data input when the warning message is displayed; and
input result information outputting processing for outputting the input result information acquired in the input result information acquiring processing in association with the text input component on the screen to be evaluated.

12. The non-transitory computer-readable data storage medium according to claim 11, wherein said GUI evaluation program causes the computer to perform
processing for storing, in an input result information recording section, the input result information output in the input result information outputting processing.

13. The non-transitory computer-readable data storage medium according to claim 11, wherein said GUI evaluation program causes the computer to perform
evaluation target screen information storing processing for storing, in an evaluation target storing section, information specifying a way to call up the screen to be evaluated and an input completing component on the screen to be evaluated,
wherein in the evaluation data set specifying processing and the input result information acquiring processing, processing for referring to the information stored in the evaluation target storing section to specify the screen to be evaluated, and referring to the information stored in the evaluation target is referred to complete the input on the screen to be evaluated is performed.

14. The non-transitory computer-readable data storage medium according to claim 11, wherein
in the input result information acquiring processing, processing for sequentially selecting test data stored in the test data recording section and inputting the selected test data into the text input component on the screen to be evaluated to change test input data is performed.

15. The non-transitory computer-readable data storage medium according to claim 11, wherein said GUI evaluation program causes the computer to perform
evaluation target specifying information creating processing for creating one or more of information indicative of whether test data should be input into the text input component on the screen to be evaluated, information indicative of test data to be input into the text input component on the screen to be evaluated among plural pieces of test input data stored in the test data recording section, and test input data information on the text input component on the screen to be evaluated, wherein in the input result information acquiring processing, processing for acquiring input result information according to the information created in the evaluation target specifying information creating processing is performed.

* * * * *